(12) United States Patent
Priyadarshi et al.

(10) Patent No.: US 8,997,161 B2
(45) Date of Patent: Mar. 31, 2015

(54) APPLICATION ENHANCEMENT TRACKS

(75) Inventors: Shaiwal Priyadarshi, San Diego, CA (US); Kourosh Soroushian, San Diego, CA (US); Roland Osborne, San Francisco, CA (US); Jason Braness, San Diego, CA (US); John Kelley, San Francisco, CA (US)

(73) Assignee: Sonic IP, Inc., San Diego, CA (US)

( * ) Notice: Subject to any disclaimer, the term of this patent is extended or adjusted under 35 U.S.C. 154(b) by 953 days.

(21) Appl. No.: 12/260,404

(22) Filed: Oct. 29, 2008

(65) Prior Publication Data

US 2009/0169181 A1 Jul. 2, 2009

Related U.S. Application Data

(60) Provisional application No. 61/018,628, filed on Jan. 2, 2008.

(51) Int. Cl.
*H04N 5/783* (2006.01)
*G11B 27/28* (2006.01)
*G11B 27/034* (2006.01)
*H04N 19/159* (2014.01)
*H04N 19/172* (2014.01)
(Continued)

(52) U.S. Cl.
CPC .............. *G11B 27/28* (2013.01); *G11B 27/034* (2013.01); *H04N 19/159* (2013.01); *H04N 19/172* (2013.01); *H04N 19/61* (2013.01); *H04N 19/132* (2013.01); *H04N 19/162* (2013.01); *H04N 19/59* (2013.01)
USPC ............................................ 725/90; 386/345

(58) Field of Classification Search
USPC ................. 386/343–348, 350; 725/88–90
See application file for complete search history.

(56) References Cited

U.S. PATENT DOCUMENTS

| 5,361,332 | A | 11/1994 | Yoshida et al. |
| 5,404,436 | A | 4/1995 | Hamilton |

(Continued)

FOREIGN PATENT DOCUMENTS

| CN | 1169229 | 12/1997 |
| EP | 813167 A2 | 12/1997 |

(Continued)

OTHER PUBLICATIONS

Tan et al., "Video Transcoder for Fast Forward/Reverse Video Playback", IEEE ICIP, pp. I-713 to I-716, 2002.*

(Continued)

*Primary Examiner* — David Harvey
(74) *Attorney, Agent, or Firm* — KPPB LLP

(57) ABSTRACT

Systems and methods of providing enhanced digital media playback through application enhancement tracks are described. Application enhancement tracks are derived from the main content that they are associated with and are encoded to aid the performance of one or more functions related to the content, such as visual-search using a video application enhancement track, or trick-play track. In several embodiments, a method of decoding a media file for play back includes obtaining a media file containing compressed content and an accompanying application enhancement track which is a subset of the compressed content, playing back the compressed content, and decoding frames of the application enhancement track at a rate proportional to a visual-search speed and from a location determined by the portion of the compressed content most recently played back.

17 Claims, 12 Drawing Sheets

(51) Int. Cl.
*H04N 19/61* (2014.01)
*H04N 19/132* (2014.01)
*H04N 19/162* (2014.01)
*H04N 19/59* (2014.01)

(56) References Cited

U.S. PATENT DOCUMENTS

| | | | |
|---|---|---|---|
| 5,479,303 A * | 12/1995 | Suzuki et al. | 360/72.2 |
| 5,502,766 A | 3/1996 | Boebert et al. | |
| 5,509,070 A | 4/1996 | Schull | |
| 5,715,403 A | 2/1998 | Stefik | |
| 5,717,816 A * | 2/1998 | Boyce et al. | 386/205 |
| 5,754,648 A | 5/1998 | Ryan et al. | |
| 5,805,700 A | 9/1998 | Nardone et al. | |
| 5,867,625 A * | 2/1999 | McLaren | 386/326 |
| 5,887,110 A * | 3/1999 | Sakamoto et al. | 386/326 |
| 5,892,900 A | 4/1999 | Ginter et al. | |
| 5,946,446 A * | 8/1999 | Yanagihara | 386/326 |
| 5,999,812 A | 12/1999 | Himsworth | |
| 6,018,611 A * | 1/2000 | Nogami et al. | 386/284 |
| 6,031,622 A | 2/2000 | Ristow et al. | |
| 6,044,469 A | 3/2000 | Horstmann | |
| 6,047,100 A * | 4/2000 | McLaren | 386/343 |
| 6,058,240 A * | 5/2000 | McLaren | 386/326 |
| 6,064,794 A | 5/2000 | Mclaren et al. | |
| 6,097,877 A * | 8/2000 | Katayama et al. | 386/314 |
| 6,141,754 A | 10/2000 | Choy | |
| 6,155,840 A | 12/2000 | Sallette | |
| 6,175,921 B1 | 1/2001 | Rosen | |
| 6,195,388 B1 | 2/2001 | Choi et al. | |
| 6,222,981 B1* | 4/2001 | Rijckaert | 386/314 |
| 6,282,653 B1 | 8/2001 | Berstis et al. | |
| 6,289,450 B1 | 9/2001 | Pensak et al. | |
| 6,292,621 B1* | 9/2001 | Tanaka et al. | 386/287 |
| 6,389,218 B2* | 5/2002 | Gordon et al. | 386/314 |
| 6,418,270 B1* | 7/2002 | Steenhof et al. | 386/343 |
| 6,449,719 B1 | 9/2002 | Baker | |
| 6,466,671 B1 | 10/2002 | Maillard et al. | |
| 6,466,733 B1* | 10/2002 | Kim | 386/263 |
| 6,510,513 B1 | 1/2003 | Danieli | |
| 6,510,554 B1* | 1/2003 | Gordon et al. | 725/90 |
| 6,621,979 B1 | 9/2003 | Eerenberg | |
| 6,658,056 B1 | 12/2003 | Duruöz et al. | |
| 6,807,306 B1 | 10/2004 | Girgensohn et al. | |
| 6,810,389 B1 | 10/2004 | Meyer | |
| 6,859,496 B1 | 2/2005 | Boroczky et al. | |
| 6,956,901 B2 | 10/2005 | Boroczky et al. | |
| 6,965,724 B1* | 11/2005 | Boccon-Gibod et al. | 386/344 |
| 6,965,993 B2 | 11/2005 | Baker | |
| 7,007,170 B2 | 2/2006 | Morten | |
| 7,023,924 B1* | 4/2006 | Keller et al. | 375/240.26 |
| 7,043,473 B1 | 5/2006 | Rassool et al. | |
| 7,150,045 B2 | 12/2006 | Koelle et al. | |
| 7,151,832 B1 | 12/2006 | Fetkovich et al. | |
| 7,151,833 B2 | 12/2006 | Candelore et al. | |
| 7,165,175 B1 | 1/2007 | Kollmyer et al. | |
| 7,185,363 B1 | 2/2007 | Narin et al. | |
| 7,231,132 B1* | 6/2007 | Davenport | 386/343 |
| 7,242,772 B1 | 7/2007 | Tehranchi | |
| 7,328,345 B2 | 2/2008 | Morten et al. | |
| 7,349,886 B2 | 3/2008 | Morten et al. | |
| 7,356,143 B2 | 4/2008 | Morten | |
| 7,376,831 B2 | 5/2008 | Kollmyer et al. | |
| 7,406,174 B2 | 7/2008 | Palmer | |
| 7,472,280 B2 | 12/2008 | Giobbi | |
| 7,478,325 B2 | 1/2009 | Foehr | |
| 7,484,103 B2 | 1/2009 | Woo et al. | |
| 7,526,450 B2 | 4/2009 | Hughes et al. | |
| 7,594,271 B2 | 9/2009 | Zhuk et al. | |
| 7,640,435 B2 | 12/2009 | Morten | |
| 7,720,352 B2* | 5/2010 | Belknap et al. | 386/271 |
| 7,817,608 B2 | 10/2010 | Rassool et al. | |
| 7,962,942 B1* | 6/2011 | Craner | 725/88 |
| 7,991,156 B1 | 8/2011 | Miller | |
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,065,708 B1* | 11/2011 | Smyth et al. | 725/93 |
| 8,201,264 B2 | 6/2012 | Grab et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,261,356 B2 | 9/2012 | Choi et al. | |
| 8,265,168 B1* | 9/2012 | Masterson et al. | 375/240.25 |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,291,460 B1 | 10/2012 | Peacock | |
| 8,311,115 B2 | 11/2012 | Gu et al. | |
| 8,321,556 B1 | 11/2012 | Chatterjee et al. | |
| 8,386,763 B2 | 2/2013 | Park | |
| 8,412,841 B1 | 4/2013 | Swaminathan et al. | |
| 8,456,380 B2 | 6/2013 | Pagan | |
| 8,472,792 B2 | 6/2013 | Butt | |
| 8,515,265 B2 | 8/2013 | Kwon et al. | |
| 8,781,122 B2 | 7/2014 | Chan et al. | |
| 2001/0036355 A1 | 11/2001 | Kelly et al. | |
| 2001/0046299 A1 | 11/2001 | Wasilewski et al. | |
| 2002/0051494 A1 | 5/2002 | Yamaguchi et al. | |
| 2002/0110193 A1 | 8/2002 | Yoo et al. | |
| 2002/0136298 A1 | 9/2002 | Anantharamu et al. | |
| 2003/0001964 A1 | 1/2003 | Masukura et al. | |
| 2003/0002578 A1 | 1/2003 | Tsukagoshi et al. | |
| 2003/0035488 A1 | 2/2003 | Barrau | |
| 2003/0035545 A1 | 2/2003 | Jiang | |
| 2003/0035546 A1 | 2/2003 | Jiang et al. | |
| 2003/0093799 A1 | 5/2003 | Kauffman et al. | |
| 2003/0152370 A1 | 8/2003 | Otomo et al. | |
| 2003/0163824 A1 | 8/2003 | Gordon et al. | |
| 2003/0174844 A1 | 9/2003 | Candelore | |
| 2003/0185542 A1 | 10/2003 | McVeigh et al. | |
| 2003/0229900 A1 | 12/2003 | Reisman | |
| 2003/0231863 A1 | 12/2003 | Eerenberg et al. | |
| 2003/0231867 A1 | 12/2003 | Gates et al. | |
| 2003/0233464 A1 | 12/2003 | Walpole et al. | |
| 2003/0236836 A1 | 12/2003 | Borthwick | |
| 2003/0236907 A1 | 12/2003 | Stewart et al. | |
| 2004/0031058 A1 | 2/2004 | Reisman | |
| 2004/0081333 A1 | 4/2004 | Grab et al. | |
| 2004/0093618 A1* | 5/2004 | Baldwin et al. | 725/101 |
| 2004/0105549 A1 | 6/2004 | Suzuki et al. | |
| 2004/0136698 A1 | 7/2004 | Mock | |
| 2004/0139335 A1 | 7/2004 | Diamand et al. | |
| 2004/0158878 A1 | 8/2004 | Ratnakar et al. | |
| 2004/0184534 A1* | 9/2004 | Wang | 375/240.03 |
| 2004/0255115 A1 | 12/2004 | DeMello et al. | |
| 2005/0038826 A1 | 2/2005 | Bae et al. | |
| 2005/0071280 A1 | 3/2005 | Irwin | |
| 2005/0114896 A1 | 5/2005 | Hug | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0036549 A1 | 2/2006 | Wu | |
| 2006/0037057 A1* | 2/2006 | Xu | 725/90 |
| 2006/0052095 A1 | 3/2006 | Vazvan | |
| 2006/0053080 A1 | 3/2006 | Edmonson et al. | |
| 2006/0064605 A1 | 3/2006 | Giobbi | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0136817 A1 | 6/2007 | Nguyen | |
| 2007/0140647 A1 | 6/2007 | Kusunoki et al. | |
| 2007/0154165 A1 | 7/2007 | Hemmeryckx-Deleersnijder et al. | |

(56) References Cited

U.S. PATENT DOCUMENTS

| | | |
|---|---|---|
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0192810 A1 | 8/2007 | Pritchett et al. |
| 2007/0217759 A1* | 9/2007 | Dodd .......................... 386/68 |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0292107 A1 | 12/2007 | Yahata et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0187283 A1* | 8/2008 | Takahashi ................... 386/68 |
| 2008/0192818 A1 | 8/2008 | DiPietro et al. |
| 2008/0195744 A1 | 8/2008 | Bowra et al. |
| 2008/0256105 A1 | 10/2008 | Nogawa et al. |
| 2008/0263354 A1 | 10/2008 | Beuque |
| 2008/0279535 A1 | 11/2008 | Haque et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0150557 A1 | 6/2009 | Wormley et al. |
| 2009/0169181 A1 | 7/2009 | Priyadarshi et al. |
| 2009/0178090 A1* | 7/2009 | Oztaskent ................... 725/90 |
| 2009/0196139 A1* | 8/2009 | Bates et al. ................. 369/100 |
| 2009/0201988 A1 | 8/2009 | Gazier et al. |
| 2009/0226148 A1 | 9/2009 | Nesvadba et al. |
| 2009/0290706 A1 | 11/2009 | Amini et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1* | 12/2009 | Lee ............................. 386/68 |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0095121 A1 | 4/2010 | Shetty et al. |
| 2010/0107260 A1 | 4/2010 | Orrell et al. |
| 2010/0111192 A1 | 5/2010 | Graves |
| 2010/0142917 A1* | 6/2010 | Isaji ............................. 386/68 |
| 2010/0158109 A1 | 6/2010 | Dahlby et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2011/0047209 A1 | 2/2011 | Lindholm et al. |
| 2011/0066673 A1 | 3/2011 | Outlaw |
| 2011/0080940 A1 | 4/2011 | Bocharov et al. |
| 2011/0082924 A1 | 4/2011 | Gopalakrishnan |
| 2011/0126191 A1 | 5/2011 | Hughes et al. |
| 2011/0135090 A1 | 6/2011 | Chan et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0268178 A1 | 11/2011 | Park |
| 2011/0302319 A1 | 12/2011 | Ha et al. |
| 2011/0305273 A1 | 12/2011 | He et al. |
| 2011/0314176 A1 | 12/2011 | Frojdh et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0179834 A1 | 7/2012 | Van Der et al. |
| 2012/0254455 A1 | 10/2012 | Adimatyam et al. |
| 2012/0260277 A1 | 10/2012 | Kosciewicz |
| 2012/0278496 A1 | 11/2012 | Hsu |
| 2012/0307883 A1 | 12/2012 | Graves |
| 2012/0311094 A1 | 12/2012 | Biderman et al. |
| 2013/0019107 A1 | 1/2013 | Grab et al. |
| 2013/0044821 A1 | 2/2013 | Braness et al. |
| 2013/0046902 A1 | 2/2013 | Villegas Nuñez et al. |
| 2013/0061040 A1 | 3/2013 | Kiefer et al. |
| 2013/0061045 A1 | 3/2013 | Kiefer et al. |
| 2013/0114944 A1* | 5/2013 | Soroushian et al. .......... 386/353 |
| 2013/0166765 A1 | 6/2013 | Kaufman |
| 2013/0166906 A1 | 6/2013 | Swaminathan et al. |
| 2014/0101722 A1 | 4/2014 | Moore |
| 2014/0189065 A1 | 7/2014 | Schaar et al. |
| 2014/0201382 A1 | 7/2014 | Shivadas et al. |
| 2014/0250473 A1 | 9/2014 | Braness et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |

FOREIGN PATENT DOCUMENTS

| | | | |
|---|---|---|---|
| EP | 936812 | A1 | 8/1999 |
| EP | 1553779 | A1 | 7/2005 |
| EP | 1553779 | A1 | 7/2005 |
| JP | 08046902 | A | 2/1996 |
| JP | 8111842 | A | 4/1996 |
| JP | 09-037225 | * | 2/1997 |
| JP | 11164307 | A | 6/1999 |
| JP | 11275576 | A | 10/1999 |
| JP | 2001346165 | A | 12/2001 |
| JP | 2002518898 | A | 6/2002 |
| JP | 2004515941 | A | 5/2004 |
| JP | 2004187161 | A | 7/2004 |
| JP | 2007235690 | A | 9/2007 |
| KR | 669616 | B1 * | 1/2007 |
| WO | 96/13121 | | 5/1996 |
| WO | 96/13121 | A1 | 5/1996 |
| WO | 9965239 | A2 | 12/1999 |
| WO | 0165762 | A2 | 9/2001 |
| WO | 0235832 | A2 | 5/2002 |
| WO | 0237210 | A2 | 5/2002 |
| WO | 02054196 | A2 | 7/2002 |
| WO | 2004102571 | A1 | 11/2004 |
| WO | 2009065137 | A1 | 5/2009 |
| WO | 2010060106 | A1 | 5/2010 |
| WO | 2010122447 | A1 | 10/2010 |
| WO | 2011068668 | A1 | 6/2011 |
| WO | 2011103364 | A1 | 8/2011 |
| WO | 2012094171 | A1 | 7/2012 |
| WO | 2012094181 | A2 | 7/2012 |
| WO | 2012094189 | A1 | 7/2012 |
| WO | 2013032518 | A2 | 3/2013 |
| WO | 2013032518 | A3 | 9/2013 |

OTHER PUBLICATIONS

Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.

Author Unknown, "Blu-ray Movie Bitrates Here—Blu-ray Forum", printed Oct. 30, 2008 from http://forum.blu-ray.com/showthread.php?t=3338, 6 pgs.

Author Unknown, "O'Reilly—802.11 Wireless Networks: The Definitive Guide, Second Edition", printed Oct. 30, 2008 from http://oreilly.com/catalog/9780596100520, 2 pgs.

(56) References Cited

OTHER PUBLICATIONS

Author Unknown, "Turbo-Charge Your Internet and PC Performance", printed Oct. 30, 2008 from Speedtest.net—The Global Broadband Speed Test, 1 pg.
Author Unknown, "When is 54 Not Equal to 54? A Look at 802.11a, b and g Throughput", printed Oct. 30, 2008 from http://www.oreillynet..com/pub/a/wireless/2003/08/08/wireless?throughput.htm., 4 pgs.
Author Unknown, "White paper, The New Mainstream Wireless LAN Standard", Broadcom Corporation, Jul. 2003, 12 pgs.
Garg et al., "An Experimental Study of Throughput for UDP and VoIP Traffic in IEEE 802.11b Networks", Wireless Communications and Networkings, Mar. 2003, pp. 1748-1753.
Kozintsev et al., "Improving last-hop multicast streaming video over 802.11", Workshop on Broadband Wireless Multimedia, Oct. 2004, pp. 1-10.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Wang et al., "Image Quality Assessment: From Error Visibility to Structural Similarity", IEEE Transactions on Image Processing, Apr. 2004, vol. 13, No. 4, pp. 600-612.
International Search Report for International Application No. PCT/US2008/087999, date completed Feb. 7, 2009, date mailed Mar. 19, 2009, 2 pgs.
Written Opinion of the International Searching Authority for International Application No. PCT/US2008/087999, date completed Feb. 7, 2009, date mailed Mar. 19, 2009, 4 pgs.
European Search Report Application No. EP 08870152, Search Completed May 19, 2011, Mailed May 26, 2011, 10 pgs.
"IBM Closes Cryptolopes Unit," Dec. 17, 1997, CNET News, Retrieved from http://news.cnet.com/IBM-closes-Cryptolopes-unit/2100-1001_3206465.html, 3 pages.
"Information Technology—Coding of Audio Visual Objects—Part 2: Visual" International Standard, ISO/IEC 14496-2, Third Edition, Jun. 1, 2004, pp. 1-724.
"Supported Media Formats", Supported Media Formats, Android Developers, Nov. 27, 2013, 3 pages.
Cloakware Corporation, "Protecting Digital Content Using Cloakware Code Transformation Technology", Version 1.2, May 2002, pp. 1-10.
European Search Report for Application 11855103.5, search completed Jun. 26, 2014, 9 pages.
European Search Report for Application 11855237.1, search completed Jun. 12, 2014, 9 pages.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, 3 pages.
International Preliminary Report on Patentability for International Application No. PCT/US2011/068276, International Filing Date Dec. 31, 2011, Issue Date Mar. 4, 2014, 23 pages.
International Search Report and Written Opinion for International Application No. PCT/US2010/56733, International Filing Date Nov. 15, 2010, Report Completed Jan. 3, 2011, Mailed Jan. 14, 2011, 9 pages.
International Search Report and Written Opinion for International Application PCT/US2011/066927, International Filing Date Dec. 22, 2011, Report Completed Apr. 3, 2012, Mailed Apr. 20, 2012, 14 pages.
International Search Report and Written Opinion for International Application PCT/US2011/067167, International Filing Date Dec. 23, 2011, Report Completed Jun. 19, 2012, Mailed Jul. 2, 2012, 11 pages.
International Search Report and Written Opinion for International Application PCT/US2011/068276, International Filing Date Dec. 31, 2011, Report completed Jun. 19, 2013, Mailed Jul. 8, 2013, 24 pages.
International Search Report for International Application No. PCT/US2005/025845 International Filing Date Jul. 21, 2005, Report Completed Feb. 5, 2007, Mailed May 10, 2007, 3 pages.
International Search Report for International Application No. PCT/US2007/063950 International Filing Date Mar. 14, 2007, Report Completed Feb. 19, 2008, Mailed Mar. 19, 2008, 3 pages.
ITS International, "Fleet System Opts for Mobile Server", Aug. 26, 1999, 1 page.
Microsoft, Microsoft Media Platform: Player Framework, "Silverlight Media Framework v1.1", 2 pages.
Microsoft, Microsoft Media Platform: Player Framework, "Microsoft Media Platform: Player Framework v2.5 (formerly Silverlight Media Framework)", 2 pages.
The Official Microsoft IIS Site, Smooth Streaming Client, 4 pages.
Written Opinion for International Application No. PT/US2005/025845, International Filing Date Jul. 21, 2005, Report Completed Feb. 5, 2007, Mailed May 10, 2007, 5 pages.
Written Opinion for International Application No. PCT/US2007/063950, International Filing Date Mar. 14, 2007, Report Completed Mar. 1, 2008, Mailed Mar. 19, 2008, 6 pages.
"Adaptive Streaming Comparison", Jan. 28, 2010, 5 pages.
"Best Practices for Multi-Device Transcoding", Kaltura Open Source Video, 13 pages.
"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for . . . -a018239381, 6 pages.
"Netflix turns on subtitles for PC, Mac streaming", 3 pages.
Supplementary European Search Report for Application No. EP 10834935, International Filing Date Nov. 15, 2010, Search Completed May 27, 2014, 9 pgs.
"Thread: SSME (Smooth Streaming Medial Element) config.xml review (Smooth Streaming Client configuration file)", 3 pages.
"Transcoding Best Practices", From movideo, Nov. 27, 2013, 5 pages.
Inlet Technologies, "The World's First Live Smooth Streaming Event: The French Open", 2 pages.
Kim, Kyuheon, "MPEG-2 ES/PES/TS/PSI", Kyung-Hee University, Oct. 4, 2010, 66 pages.
Kurzke et al., "Get Your Content Onto Google TV", Google, Retrieved from: http://commondatastorage.googleapis.com/io2012/presentations/live/%20to%20website/1300.pdf, 58 pages.
Lang, "Expression Encoder, Best Practices for Live Smooth Streaming Broadcasting", Microsoft Corporation, 20 pages.
Levkov, "Mobile Encoding Guidelines for Android Powered Devices", Adobe Systems Inc., Addendum B, source and date unknown, 42 pages.
MSDN, "Adaptive streaming, Expression Studio 2.0", 2 pages.
Nelson, "Arithmetic Coding+Statistical Modeling=Data Compression: Part 1—Arithmetic Coding", Doctor Dobb's Journal, Feb. 1991, printed from http://www.dogma.net/markn/articles/arith/art1.htm, Jul. 2, 2003, 12 pages.
Nelson, "Smooth Streaming Deployment Guide", Microsoft Expression Encoder, Aug. 2010, 66 pages.
Nelson, Michael, "IBM's Cryptolopes," Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noe, "Matroska File Format (under construction!)", Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pages.

(56) References Cited

OTHER PUBLICATIONS

"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pages.

Akhshabi et al., "An Experimental Evaluation of Rate-Adaptation Algorithms in Adaptive Streaming over HTTP", MMSys'11, Feb. 24-25, 2011, 12 pages.

Anonymous, "Method for the Encoding of a Compressed Video Sequence Derived from the Same Video Sequence Compressed at a Different Bit Rate Without Loss of Data", ip.com, ip.com No. IPCOM000008165D, May 22, 2012, pp. 1-9.

Author Unknown, "Entropy and Source Coding (Compression)", TCOM 570, Sep. 1999, pp. 1-22.

Author Unknown, "MPEG-4 Video Encoder: Based on International Standard ISO/IEC 14496-2", Patni Computer Systems, Ltd., Publication date unknown, 15 pages.

Author Unknown, "Tunneling QuickTime RTSP and RTP over HTTP", Published by Apple Computer, Inc.: 1999 (month unknown), 6 pages.

Blasiak, Darek, Video Transrating and Transcoding: Overview of Video Transrating and Transcoding Technologies, Ingenient Technologies, TI Developer Conference, Aug. 6-8, 2002, 22 pages.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pages.

Gannes, "The Lowdown on Apple's HTTP Adaptive Bitrate Streaming", GigaOM, Jun. 10, 2009, 12 pages.

Ghosh, "Enhancing Silverlight Video Experiences with Contextual Data", Retrieved from: http://msdn.microsoft.com/en-us/magazine/ee336025.aspx, 15 pages.

Inlet Technologies, "Adaptive Delivery to iDevices", 2 pages.

Inlet Technologies, "Adaptive Delivery to iPhone 3.0", 2 pages.

Inlet Technologies, "HTTP versus RTMP", 3 pages.

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pages.

Pantos, "HTTP Live Streaming: draft-pantos-http-live-streaming-06", Published by the Internet Engineering Task Force (IETF), Mar. 31, 2011, 24 pages.

Phamdo, Nam, "Theory of Data Compression", printed from http://www.datacompression.com/theoroy.html on Oct. 10, 2003, 12 pages.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pages.

Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.

Siglin, "HTTP Streaming: What You Need to Know", streamingmedia.com, 2010, 16 pages.

Siglin, "Unifying Global Video Strategies, MP4 File Fragmentation for Broadcast, Mobile and Web Delivery", Nov. 16, 2011, 16 pages.

Wu, Feng et al., "Next Generation Mobile Multimedia Communications: Media Codec and Media Transport Perspectives", In China Communications, Oct. 2006, pp. 30-44.

Zambelli, Alex, "IIS Smooth Streaming Technical Overview", Microsoft Corporation, Mar. 2009.

* cited by examiner

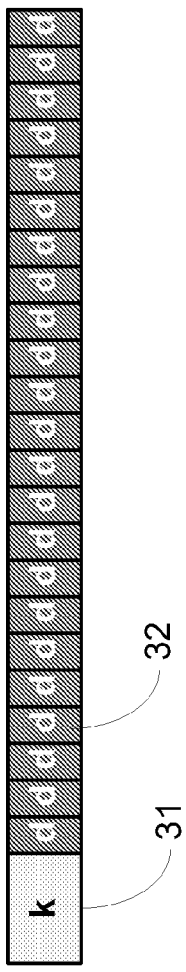
FIG. 2
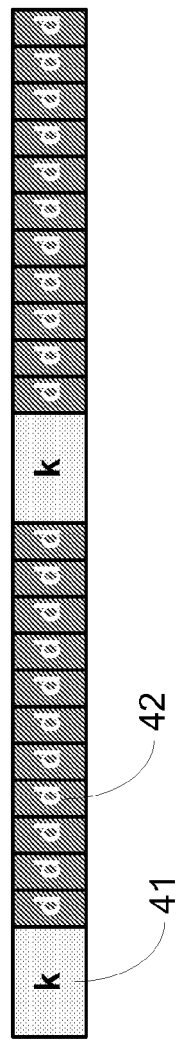
FIG. 3
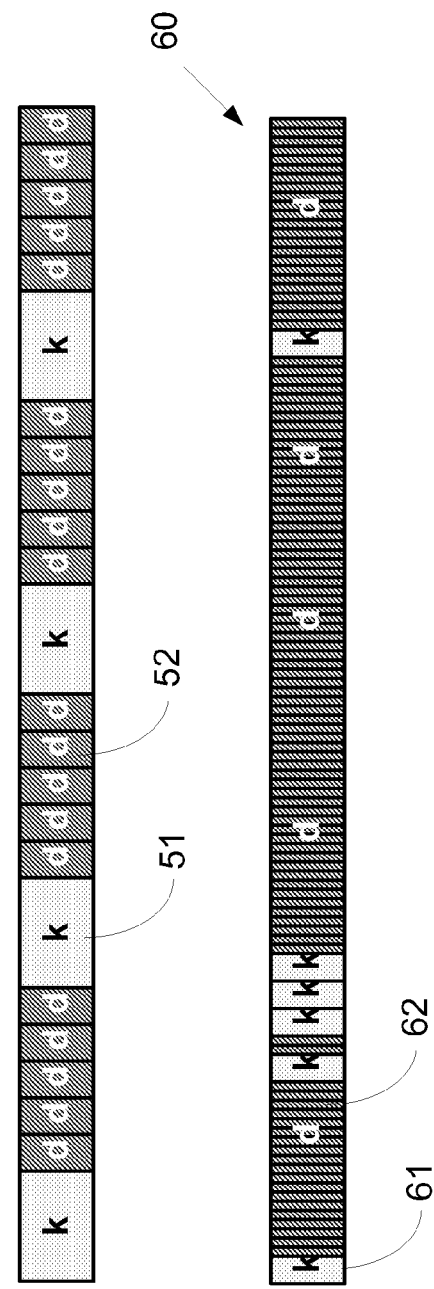
FIG. 4
FIG. 5

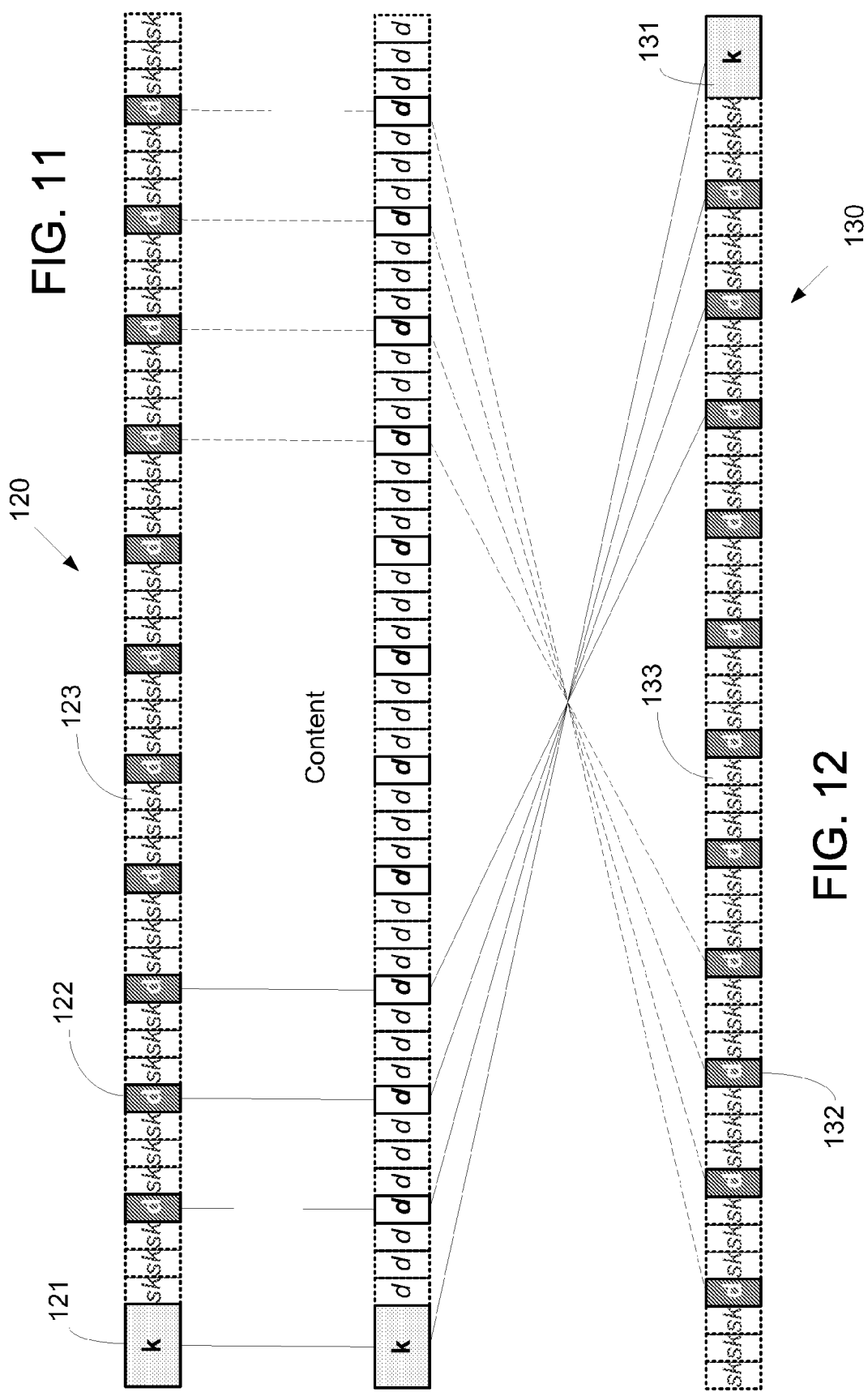

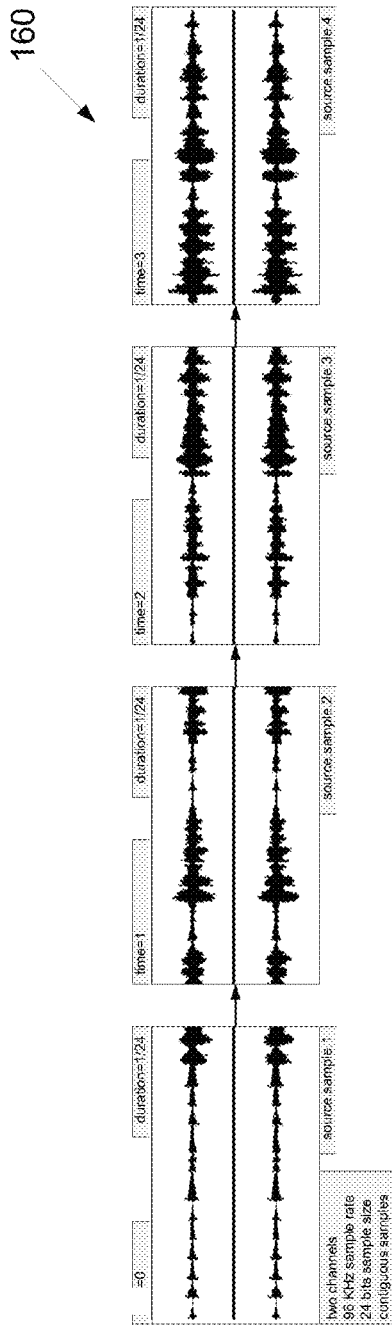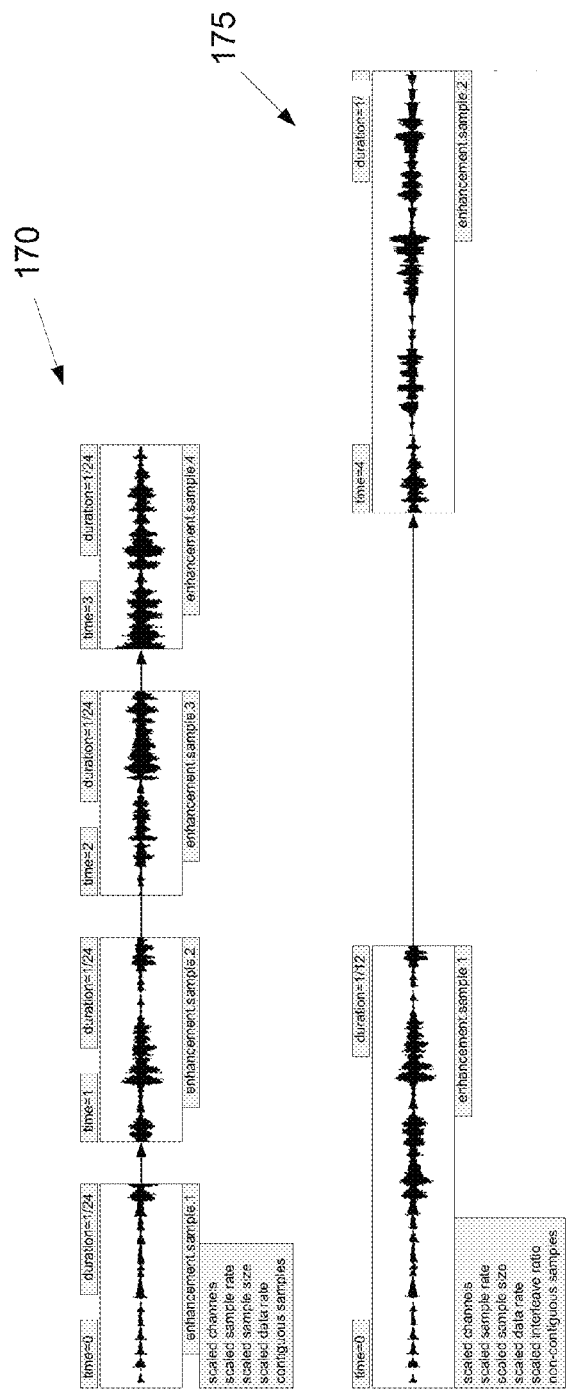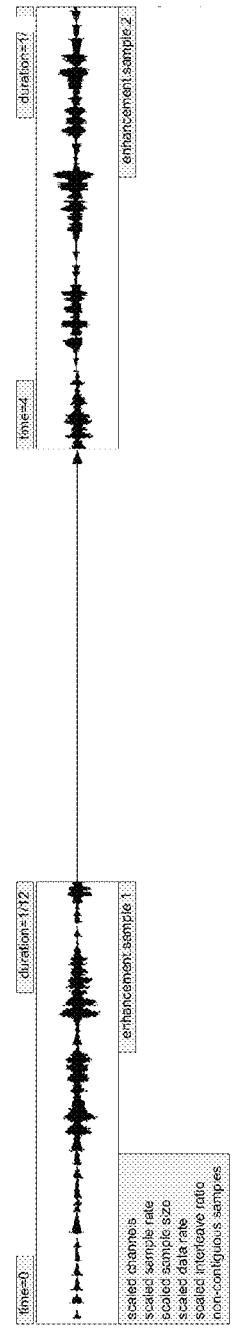
FIG. 15
FIG. 16
FIG. 17

APPLICATION ENHANCEMENT TRACKS

CROSS-REFERENCE TO RELATED APPLICATIONS

This application claims the benefit of U.S. Provisional Patent Application No. 61/018,628 filed Jan. 2, 2008, the disclosure of which is hereby incorporated by reference as if set forth in full herein.

BACKGROUND

The present invention relates generally to digital video distribution and playback systems and in particular to digital video distribution and playback systems providing enhanced playback control.

The digital video revolution is evolving from a physical-media distribution model to electronic-media distribution models that utilize Content Delivery Networks (CDNs) and Consumer Grade Networks (CGNs—such as residential Internet and in-home networks) for delivery of content to devices. The utilization of the Advanced Video Coding (AVC/H.264) standard is prevalent in today's optical and broadcast industries, but the adoption of this standard at bit-rates suitable for CDN/CGN distribution has not yet materialized in a unified and open specification for resolutions including full-HD (1080p) video.

Digital video formats however are typically designed to efficiently support playback of content. Other common user functions are typically supported through increased player complexity (and therefore cost) or the performance of the other functions is compromised, limiting the quality of the user-experience.

For example, visual-search through digitally encoded multimedia files is typically performed by displaying only the key-frames (aka intra-frames) of the relevant video stream. The key-frames are displayed for a time corresponding to the speed of the visual search being performed by the user and some may be skipped when a high search speed is requested. Alternate methods may decode all or parts of the video stream at higher rates and display selective frames to visually increase the presentation speed. These methods for visual-search may deliver a poor visual experience to the user due to the coarseness and inconsistency of the temporal difference between displayed images. Complicating matters even more is that devices operate differently depending on whether visual-search is performed in the forward or reverse direction. Finally, devices may require the video stream to be read at speeds that are multiple times higher than the standard rate required to playback the video in normal speed, challenging the device's subsystems.

Similarly, other typical functions performed or required to be performed during a playback session with a single or with multiple titles of content can often be limited in their ability to deliver a consistent, high-quality experience to the user.

SUMMARY

Generally, the present invention provides a specific set of operating points that have been devised in order to maximize compatibility across both personal computer (PC) and consumer electronics (CE) platforms, resulting in high quality video at data rates that are encoded at up to 40% lower rates than those of the H.264 Level 4 data rates, while still maintaining a good visual quality level.

In particular, the effects of the CDN/CGN compression settings on visual-search are provided along with a method and system that increases the user-experience beyond traditional visual-search on optical-media. The method and system offer smooth visual-search capability in both the forward and reverse directions, operating at speeds from 2× to 200× and beyond, implementable on both PCs and CE devices that access content from optical disks or electronic sources across CDNs/CGNs. When combined, both of these features provide a high quality user-experience for content targeted at delivery over many types of networks.

In various embodiments provided herein consistent visual behavior during visual-search is provided, which operates equally well in both forward and reverse search directions, while simultaneously and substantially reducing the demands on the device in delivering the high-quality experience.

In one embodiment, a method of encoding a media file for playing back is provided. The method comprises extracting a video track from an original media file, where content is encoded in the video track; using the encoded content to encode an application enhancement track, where encoding the application enhancement track includes discarding at least some of the content; and creating a media file including the content from the original media file encoded in a video track and an accompanying application enhancement track.

In another embodiment, method of decoding a media file for playing back comprises obtaining a media file containing compressed content and an accompanying application enhancement track which is a subset of the compressed content; playing back the compressed content; and decoding frames of the application enhancement track at a rate proportional to a visual-search speed and from a location determined by the portion of the compressed content most recently played back.

In yet another embodiment, a system for playback of a media file comprises a media server and a client processor. The media server is configured to generate at least one application enhancement track from an original media file, the at least one application enhancement track having at least one frame in common with the original media file and being substantially smaller in file size than the original media file. The client processor is in network communication with the media server and is configured to send requests for the original media file to the media server. The media server is also configured to transmit the requested original media file along with the at least one application enhancement track.

In one other embodiment, a media player comprises a user interface configured to receive user instructions and a playback engine configured to decode a media file containing content and an accompanying application enhancement track, which is a subset of the content. The playback engine is configured to commence playback of the content in response to a user instruction received via the user interface. The playback engine is also configured to select portions of the application enhancement track to decode and playback in response to receipt of a user instruction received via the user interface and the portion of the content most recently played back by the playback engine.

The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

BRIEF DESCRIPTION OF THE DRAWINGS

FIG. 2 is a graphical representation of an exemplary frame distribution in one second of video at twenty four frames per second;

FIG. 3 is a graphical representation of an exemplary frame distribution in one second of video at twenty four frames per second;

FIG. 4 is a graphical representation of an exemplary frame distribution in one second of video at twenty four frames per second;

FIG. 5 is a graphical representation of an exemplary frame distribution in a predetermined section of video content;

FIG. 11 is a graphical representation of an exemplary frame distribution in two seconds of video of an application enhancement track in accordance with an embodiment of the invention;

FIG. 12 is a graphical representation of an exemplary frame distribution in two seconds of video of an application enhancement track in accordance with an embodiment of the invention;

FIG. 15 is a graphical representation of an exemplary audio distribution of two channel audio at 96 KHz sample rate and 24 bit sample sizes;

FIG. 16 is a graphical representation of spatial scaling conversion of audio content into an application enhancement track in accordance with an embodiment of the invention;

FIG. 17 is a graphical representation of temporal scaling conversion of audio content into an application enhancement track in accordance with an embodiment of the invention;

DETAILED DESCRIPTION

Generally, a digital video playback system is provided to ensure smooth playback regardless of the playback speed or direction that allows for the delivery of a high-quality experience to the user while allowing for the reduction in the processing load placed on a device.

Digitally compressed video is typically encoded using algorithms such as those defined by the MPEG committee (e.g. MPEG-2, MPEG-4 Part 2 and MPEG-4 Part 10). These algorithms encode images from the source material in to sequences of "key-frames" and "delta-frames".

Key-frames contain all the data required to display a specific image from the source video. A delta-frame contains the difference data between one or more previously decoded images and the image it encodes. In general, there is a 1:1 mapping of source images and encoded frames. However, the 1:1 mapping does not hold true when the video is encoded at a different frame rate relative to the source video sequence. Thus, to decode frame F of a video sequence, all the frames that form the basis of the difference values contained in F must first be decoded. Applied recursively, this decode method ultimately requires a key-frame to start the decode process, since it is not based on any previously decoded image. Hence, the very first frame generated by typical encoders is a key-frame.

Since key-frames are encoded independently of other frames, they require more space to be stored (or more bandwidth during transfer), and put generically, can be attributed with a higher cost than delta-frames. For the purpose of describing the current inventions, a cost ratio of key-frames (K) versus delta-frames (D) 12 is used in which the ratio of 3:1 has been selected from observation of a range of encoded video content.

Figure 1:
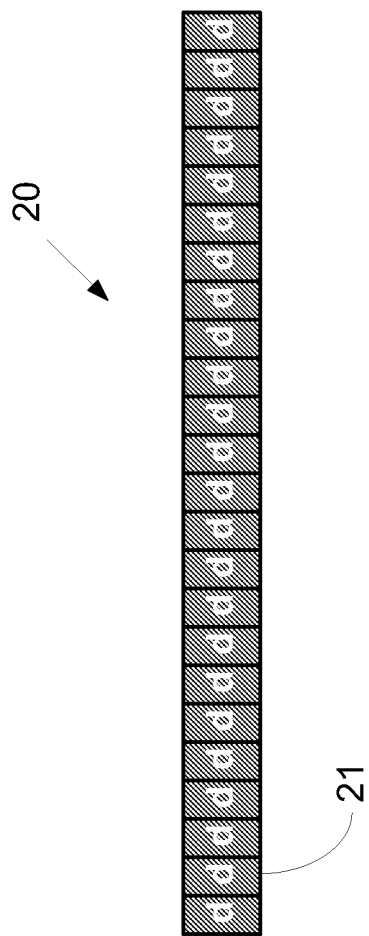
FIG. 1 is a graphical representation of an exemplary frame distribution in one second of video at twenty four frames per second.

FIG. 1 illustrates a simplified exemplary view of a minimum bandwidth approach to creating an encoded bitstream 20 (assuming that there are no scene changes), where all source images are encoded to delta-frames 21. The frame cost distribution in one second of video at 24 frames per second is low with the cost equaling the number of delta-frames multiplied by the delta-frame cost (D). However, this approach is not practical, since at least the very first frame must be encoded as a key-frame and since there needs to be other key-frames inserted at other locations in the file to facilitate trick-play, e.g., visual-search and random access functions. As shown here and in the other similar following figures, the decode order is from left to right with the order of placement of each associated frame also being from left to right.

FIG. 2 provides a view of the very first second of a video track, where it can be seen that the first encoded frame is a key-frame 31 followed by delta-frames 32. Consequently, the cost of the first second of this track has increased by approximately 8% from the delta-frame only approach of FIG. 1. (Cost=1*K+23*D=26).

FIG. 3 and FIG. 4 illustrate how the cost increases as the frequency of key-frames is increased. The tradeoff is that more frequent use of key-frames gives greater flexibility in enabling decoding to near a randomly chosen point in the bitstream. In FIG. 3, two key frames 41 are spaced between twenty two delta frames 42. (Cost=2*K+22*D=28). In FIG. 4, the number of key frames 51 is increased and the key frames are spaced within a fewer number of delta frames 52. (Cost=4*K+20*D=32).

To perform rapid visual search through an encoded video bitstream, the decoder should increase its rate of decoding to match the speed requested by the user. However, this is not always practical due to performance bottlenecks in typical systems imposed by components such as disk I/O, memory I/O and the processor itself. Furthermore, reverse decode may be cumbersome, due to the nature of the encoding method which is optimized for playback in forward chronological order. Therefore most systems may ultimately rely on schemes such as dropping the processing of certain delta-frames or processing only key-frames in an order and at a rate determined by the direction and speed of visual search being conducted by the user.

Based on at least the above-noted factors, many video formats, such as DVD, ensure that there are key-frames regularly inserted throughout the duration of the multimedia content. In fact, the DVD format requires a key-frame to be inserted approximately every 600 ms throughout the content. This regular key-frame insertion delivers good visual-search functionality but at the cost of significantly increasing the file size due to the frequent use of key-frames. Schemes such as these essentially employ encoding the content into segments with the key-frame/delta-frame distribution similar to those illustrated by FIGS. 2, 3 and 4.

Multiple efficient methods and systems to encode video content are described below in accordance with embodiments of the invention. One such encoding method and system insert key-frames at least every 10 seconds, 4 seconds for H.264 content, in the absence of scene changes, and additionally at scene-change locations. This ensures efficient encoding of typical produced content. For example, compared to the DVD method of encoding (approx. 2 key-frames per second) methods in accordance with embodiments of the invention yield much smaller file sizes.

The distribution of key-frames 61 and delta-frames 62 in content 60, encoded in accordance with an embodiment of the invention is illustrated in FIG. 5. However, with such a potentially low frequency and non-deterministic placement of key-frames, trick-play performance can be severely degraded, based on the performance metrics previously described. As explained above, the addition of extra key-frames at more frequent, regular intervals would provide the ability for applications such as visual-search to be performed with consistent, high quality behavior. However, introducing more key-frames also increases the cost of any portion of video encoding. Cost also depends on the time bracket chosen. For example, a system with 6 key-frames per second would provide a smoother visual-search capability (in systems which rely only on key-frame decoding), but could increase the cost of each second of video by 50%. This high cost is prohibitive for most wide-scale applications.

In FIG. 5, it should be noted that the section of video shown is greater than one second as shown in previous figures to better illustrate the frame distribution for this case. As such, the key-frames 61 and delta-frames 62 appear smaller than other previously shown frames. It should also be noted that the figures are not necessarily to scale, but are merely conceptual illustrations to facilitate the description of the various embodiments of the invention.

Another functional area where most devices provide a compromised user-experience is when providing the user with a list of multiple content files. Many devices simply show the text of the file name and may show a static graphical icon for each piece of content. A higher-quality experience in such cases for example could be to provide animated icons which show all or some of the content's video sequences. However, this type of capability would require a playback engine capable of decoding many pieces of content simultaneously, which is typically not feasible.

Application Enhancement Tracks

Application Enhancement Tracks (AETs) are media tracks that are encoded in a manner that improves the performance of one or more applications, or application features. Generally, AETs are re-encoded versions of one or more tracks of the source content. AETs for the most part contain significantly less data than the original file, and the data is present in a form that can be accessed easily to enhance the user-experience when one of the enhanced applications or features is being run. The data in an AET is, generally, designed such that the utilizing application does not need to achieve performance greater than that required to process the content.

Hence, an AET designed to allow "6×" visual-search through a title originally encoded at a frame-rate of 30 frames per second (fps) could be generated by re-encoding the original video to a rate of 5 fps. Thus, even when the AET was utilized to deliver "6×" visual-search, the device would experience a load of less than or equal to "1×" of that required to decode the original video. To further enhance this example, the original video could be spatially scaled down in resolution to 50% of its original size also in each of the vertical and horizontal dimensions (leading to a factor of four reduction in the number of pixels per frame); in this case the device could perform "24×" visual-search without requiring more than "1×" original video decode performance.

Figure 6:
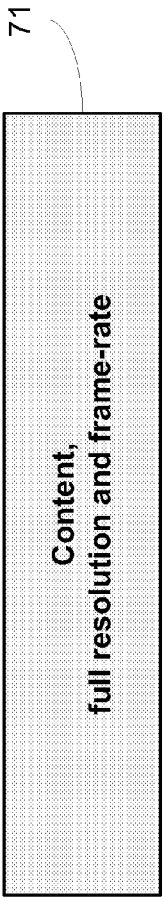
FIG. 6 is a graphical representation of an exemplary file distribution of video content and an application enhancement track in accordance with an embodiment of the invention.
Figure 7:
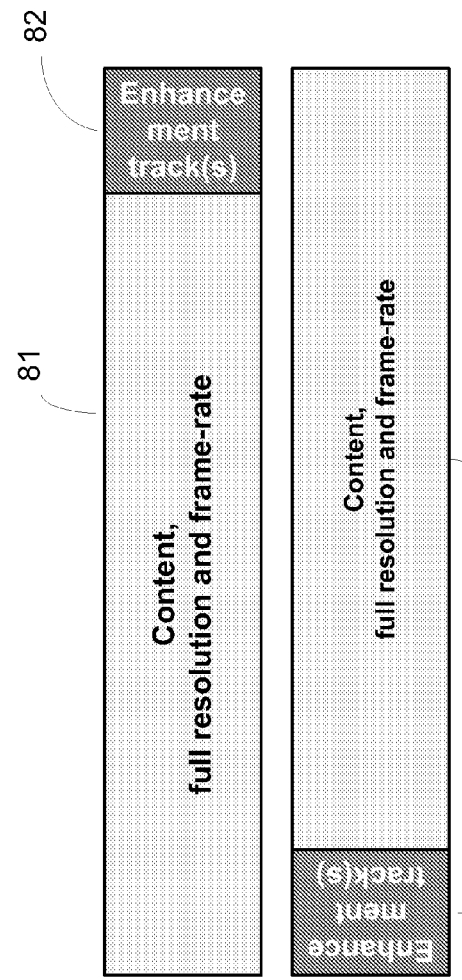
FIG. 7 is a graphical representation of an exemplary file distribution of video content and an application enhancement track in accordance with an embodiment of the invention.
Figure 8:
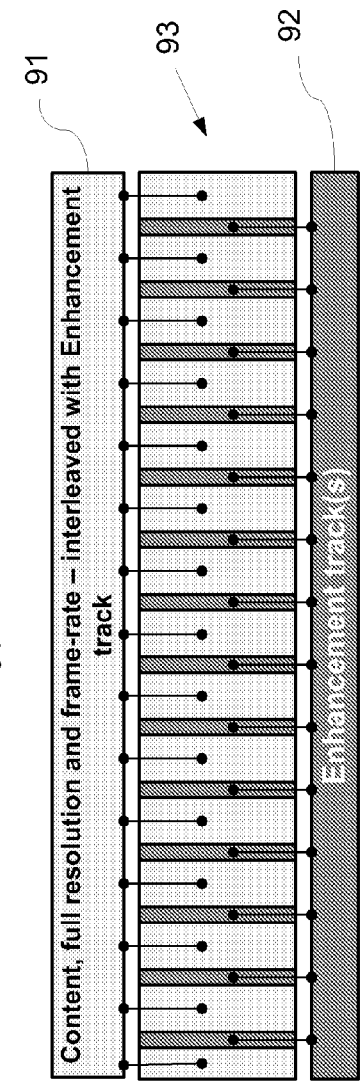
FIG. 8 is a graphical representation of an exemplary file distribution of video content and an application enhancement track in accordance with an embodiment of the invention.

The AETs can be recorded directly in to the same file as the content they offer enhancements for, or they can be stored in a separate file. When stored within the same file as the content they enhance, the enhancement track data can be interleaved with the content, or may be located in one or more contiguous blocks anywhere in the file. FIGS. 6-8 illustrate some of the different methods by which the enhancement track data can be associated with the content it enhances. Any one or any combination or all methods may be utilized to store the AETs. In FIG. 6, the content 71 is in one file and the associated AET 72 is in a separate file. In FIG. 7, the AET 82 follows or precedes the content 81. Content 91 is embedded with portions of the AET 92 or the content 91 and the AET 92 are weaved together to generate the combined content AET file 93.

Video AETs

As an example, Video AETs designed to improve the performance of visual-search and/or the displaying of dynamic icons by a preview engine can be created by optionally scaling the content to different spatial and temporal resolutions, and then re-encoding this scaled version into a data stream with a regular pattern of key-frames and, in several embodiments, delta-frames.

Figure 9:
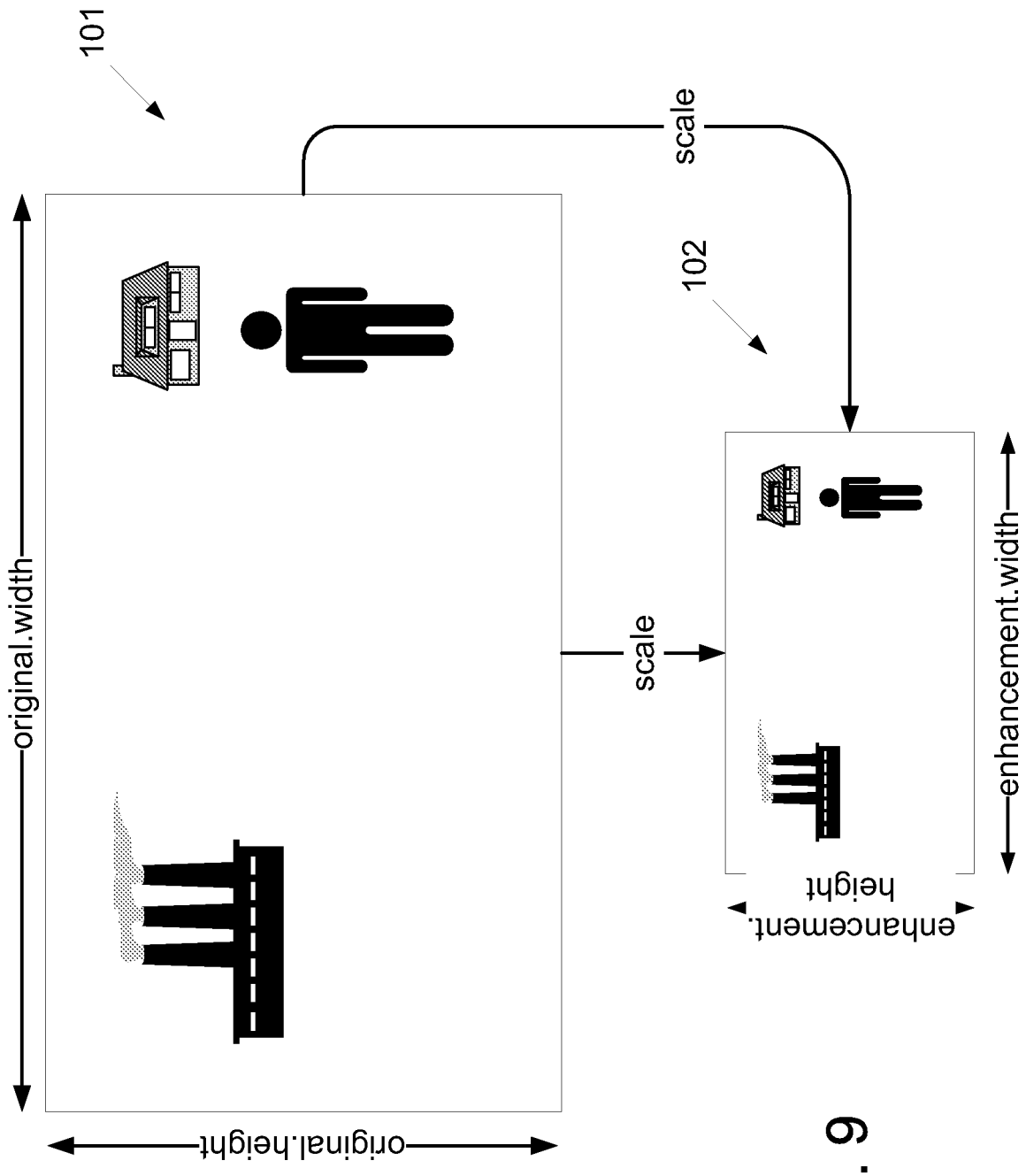
FIG. 9 is a graphical representation of spatial scaling conversion of video content into an application enhancement track in accordance with an embodiment of the invention.
Figure 10:
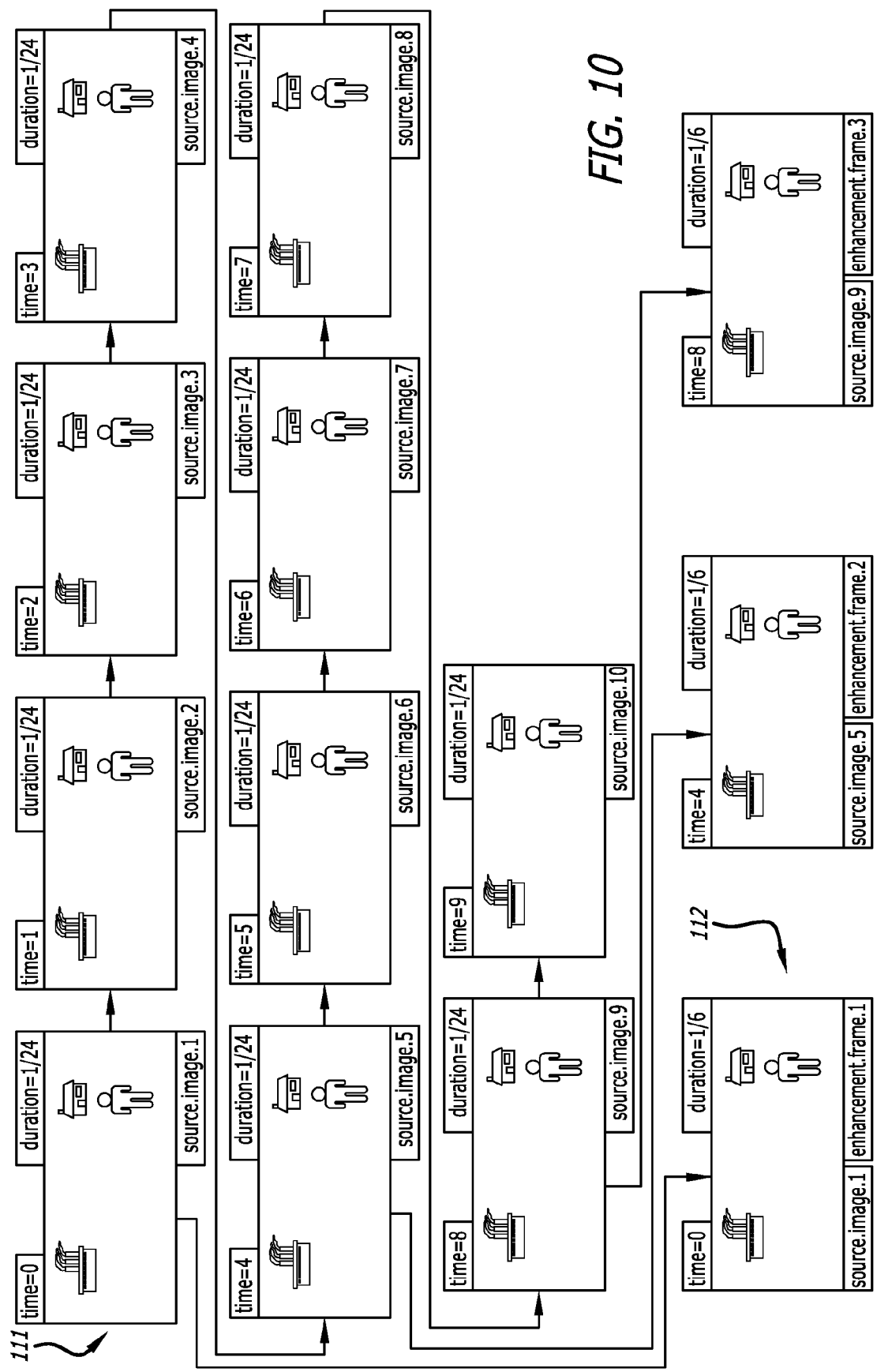
FIG. 10 is a graphical representation of temporal scaling conversion of video content into an application enhancement track in accordance with an embodiment of the invention.

FIG. 9 illustrates the spatial scaling of the video source 101 to a suitable size for the enhancement track 102. The amount of scaling could increase or decrease the spatial resolution from the source video, and may alter the aspect ratio of the source video. Spatial scaling could also be achieved by adding or cropping the original image to the size required in the AET. FIG. 10 illustrates temporal scaling of the video source 111 to a reduced rate for the enhancement track 112. However, the amount of scaling applied could increase or decrease the temporal resolution from the source. Spatial scaling may be performed before temporal scaling and vice versa.

FIGS. 11-12 illustrate examples of the order and distribution of key-frames and delta-frames in Video AETs 120,130 where the AETs contain both key-frames 121,131 and delta-frames 122,132. In these examples, FIG. 11 illustrates a frame order and distribution for an enhanced forward visual search in accordance with an embodiment of the invention and FIG. 12 illustrates a frame order and distribution for an enhanced reverse visual search in accordance with another embodiment of the invention. Frames 123,133 marked as "sk" indicate that the corresponding frame from the original source content has been skipped.

In these examples, during visual-search each frame in the AET is decoded and displayed at a rate proportional to the visual-search speed requested by the user. When the decode and display rate required by the visual-search speed exceeds the device's capabilities, the device can change mode, for example, from processing all frames to processing as many key-frames as required or pre-selected to support the required search speed. Since the key-frames have been placed at regular intervals throughout the AET, the visual performance of skipping from key-frame to key-frame will be consistent.

In a similar scheme as illustrated in FIGS. 11 and 12, each delta-frame could be predicted from a single key-frame (for example, the nearest regularly placed key-frame). In this method of encoding, an AET could be created with the property of needing no more than two decode cycles to display any frame in the AET. This scheme offers a refinement to the key-frame to key-frame skipping solution when performing rapid visual-searches, and allows for an intermediate state of speed where all key-frames and some delta-frames are decoded and displayed. Such an encoding method would also support bi-directional visual-searches.

Referring again to FIG. 12, the visual-search AET that is designed to specifically support reverse visual-search is generated by encoding the source video in reverse chronological order, while placing the encoded frames in the chronological order that they occur in the original, compressed or encoded content. This method allows reverse trick-play to be performed by reading the AET in the reverse-order of placement in the file, which is also the correct order for decoding. This method best allows the interleaving of content media track chunks with the chunks of the reverse visual-search AET.

Figure 13:
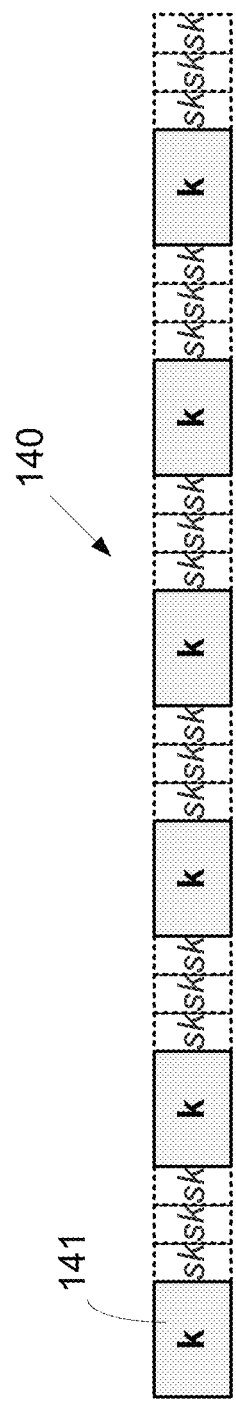
FIG. 13 is a graphical representation of an exemplary frame distribution in one second of video at twenty four frames per second in accordance with an embodiment of the invention.

FIG. 13 illustrates a single visual-search AET 140 that is encoded to support both forward and reverse search. This method uses only key-frames 141 and no delta-frames. Since key-frames contain absolute data, there is no implicit order required to decode them, therefore facilitating reverse or forward visual-search. Further examples of AETs that only include key-frames in accordance with embodiments of the invention are discussed below with reference to FIG. 19.

Figure 14A:
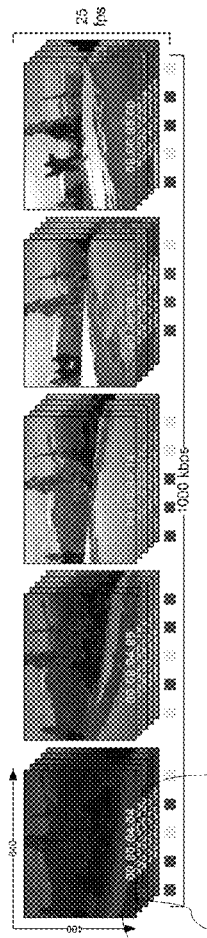
FIGS. 14A-B are graphical representations of an exemplary frame distribution of video.
Figure 14B:
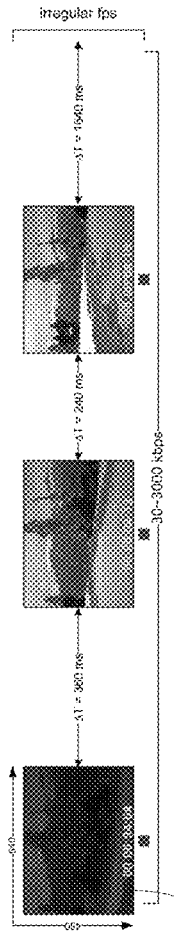
Figure 14C:
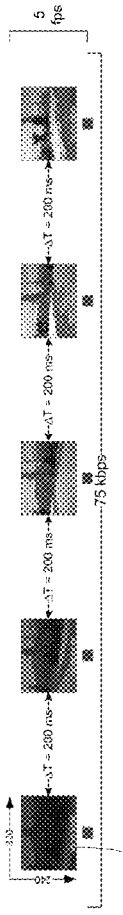
FIG. 14C is a graphical representation of an exemplary frame distribution of video of an application enhancement track in accordance with an embodiment of the invention.

FIGS. 14A-C further illustrate the visual-search AET 150 encoded to support both forward and reverse search. In FIG. 14A, a sample video 150 encoded at 25 frames-per-second is provided that includes an intra-frame type (I Frame) 151, a bi-directionally predicted frame (B Frame) 152 and a uni-directionally predicted frame (P Frame) 153. As shown, the distance between the Intra frames is not uniform, which is shown more clearly in FIG. 14B. The temporal distance between the intra frames and the bit-rates for those intra frames vary greatly across the different frames. Both of these have been resolved with the addition of the visual-search AET 150 (FIG. 14C). The bit-rates across the intra-frames are more uniform, and the temporal distance is also consistent. Both of these factors will lead to a better user experience during smooth forward and reverse operations, in both optical as well as streaming playback scenarios.

Such Video AETs may also contain information in the track's data that relate the encoded video frames with the corresponding frame or time-period in the original title. This information may be encoded as time-stamps relative to the time-line of the content, or a file-position offset, or any other mechanism.

The illustrated AETs can also enhance the content-preview experience by virtue of the same properties exploited for visual-search. In typical content-preview modes, a reduced resolution version of the content is displayed along with other information that could be used to identify the content, such as the file name, duration, etc.

By using a Video AET, such as that illustrated in FIG. 13, a content preview engine could read a portion or all of the AET data for each title to be previewed, and then decode and display the multiple AETs on one screen. Since AETs are designed to have a fraction of the processing needs of the main content, this multi-title animated preview becomes possible without having to increase the performance of the device.

Audio and Other Media AETs

In a similar fashion to Video AETs, other AETs can be created by following the same principles as those employed in creating the Video AETs. Such media tracks suitable for AETs include audio and subtitle tracks. Example methods for creating Audio AETs 170, 175, from an audio track are illustrated in FIGS. 16 and 17. FIG. 15 is an illustration of the audio track 160. In the illustrated embodiments, the audio track is sampled and then the samples are combined in AETs to enable playback of the samples in conjunction with the video AETs.

Generating AETs

In the case when a user wishes to add one or more AETs to a piece of content, then the process of creating and storing ("generating") the AET(s) will take time and processing power to perform. If this time and processing requirement are imposed on the user at the time when the user wishes to utilize the content, then this would not constitute a good user-experience since the user would be forced to wait before continuing with whatever operation that was initiated.

In one embodiment, the need to wait for the AET generation process can be removed or reduced by performing AET generation in parallel with another operation such as downloading, burning to disk, or first playback. Another embodiment would be to integrate the AET into a "background task" that executes when the user's computer is not being actively used by the user, thus allowing a user's personal catalogue of content to be processed while the user performs other applications with the computer.

Figure 18:
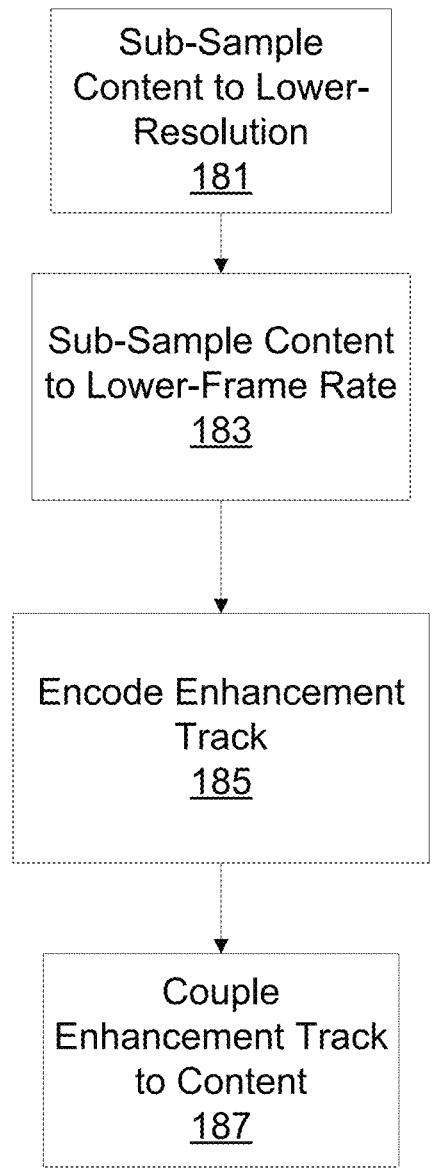
FIG. 18 is a flow chart showing a process of encoding an application enhancement track along with the content in accordance with an embodiment of the invention.

In FIG. 18, one embodiment of performing AET generation is provided. The content is sub-sampled to a lower resolution (181) which in turn this lower resolution content is sub-sampled to a lower frame rate (183). The low-resolution, low-frame-rate is encoded as a video AET as a key-frame only bit-stream (185). The resulting data is included with the content (187), e.g., either written/embedded into the content or appended to the end of the content.

For example, through experimental testing, by taking 25% of the spatial data (pixels) and 21% of the temporal data (frames) from a source, nearly 95% of the original data can be discarded. The resulting frames are all encoded as key-frames, which are known to be extremely inefficient. However, since the source being encoded is only 5% the data volume of the original, it is has been discovered that the video AET file can be anywhere from a few percent to 10% the size of the original content (a general rule of thumb of 7.5% can be used in the estimation of the encoded video AET file-size).

The following example as determined through experimental testing is also provided to at least illustrate the visual search enhancement relative to the file size. A "normally encoded" (i.e., one or more key-frames per second) movie (i.e., 23.976 fps) of resolution 1920×816 has a file-size of about 10 GB. The movie is re-mastered with a key-frame rate of one or more key-frames every 4 seconds, reducing the file-size to 8.23 GB, i.e., a 17.7% reduction. The content is then sub-sampled to a resolution of 480×272 and a frame-rate of 5 fps (25% and 21% respectively) to generate an AET source. The AET source is then encoded as key-frames only, resulting in an AET file-size of about 618 MB. The combined file-size of the "best-encoding" with "visual-search enhancement" is 8.85 GB. This is a saving of 1.15 GB from the original file-size and includes improved visual-search performance. In addition, advanced video players and media managers can use the AET to show animated content previews. In this case, a device could perform up to "40×" visual-search (in either the forward or reverse time-line) without requiring more than "1×" original video system performance. Higher speeds of visual-search can be achieved by skipping key-frames as needed to keep the system performance within the limits of the device (or software) performing the visual-search.

Figure 19:
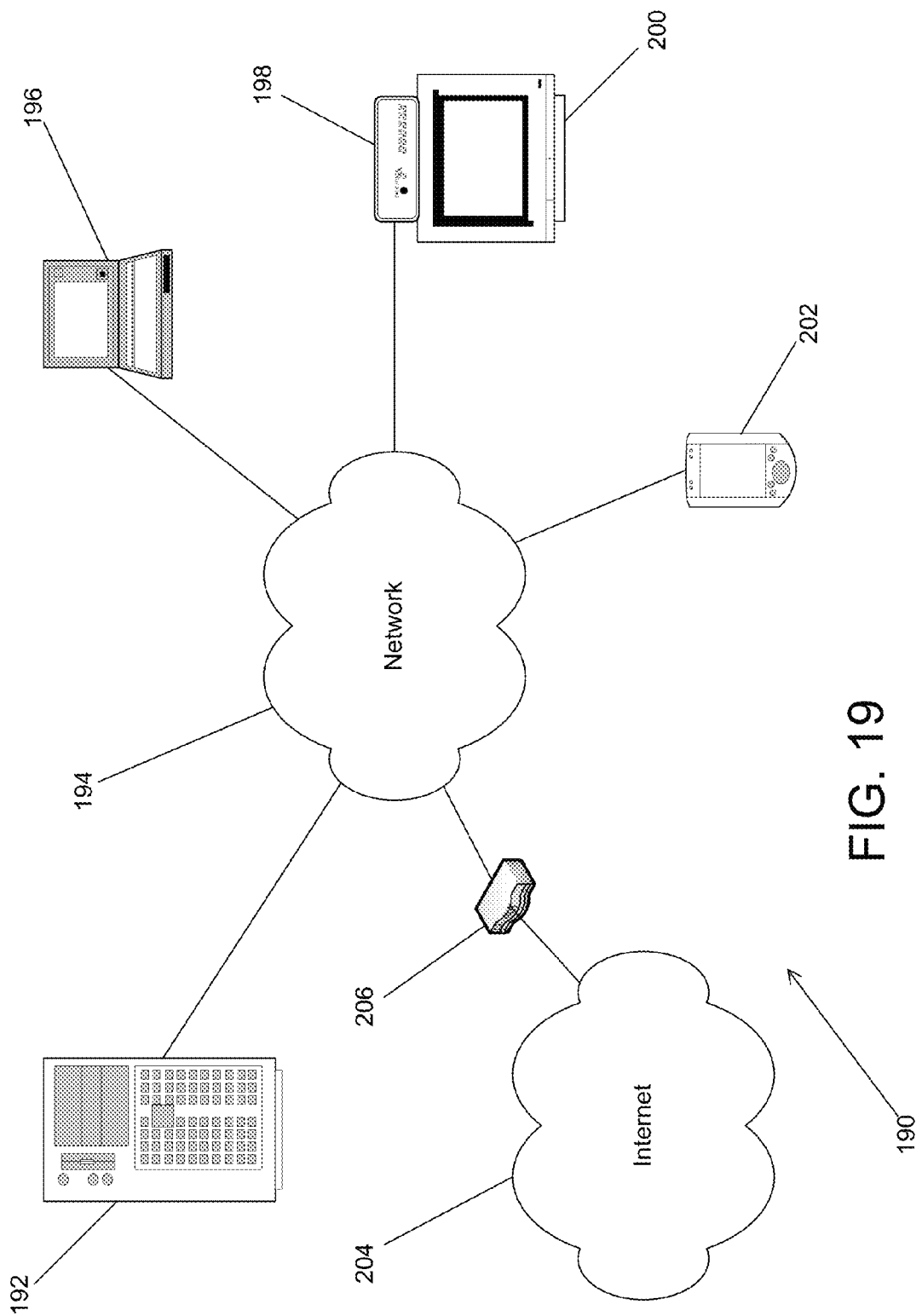
FIG. 19 is a network diagram of an exemplary system of encoding, communicating and decoding an application enhancement track and the content in accordance with an embodiment of the invention.

A playback system in accordance with an embodiment of the invention is shown in FIG. 19. The progressive playback system 190 includes a media server 192 connected to a network 194. Media files are stored on the media server 194 and can be accessed by devices configured with a client application. The media files are encoded content files coupled to or embedded with application enhancement tracks. In the illustrated embodiment, devices that access media files on the media server include a personal computer 196, a consumer electronics device such as a set top box 198 connected to a playback device such as a television 200, and a portable device such as a personal digital assistant 202 or a mobile phone handset. The devices and the media server 192 can communicate over a network 194 that is connected to the Internet 204 via a gateway 206. In other embodiments, the media server 192 and the devices communicate over the Internet.

The devices are configured with client applications that can request all or portions of media files from the media server 192 for playing. The client application can be implemented in software, in firmware, in hardware or in a combination of the above. In many embodiments, the device plays media from downloaded media files. In several embodiments, the device provides one or more outputs that enable another device to play the media. In one example, when the media file includes one or more application enhancement tracks, a device configured with a client application in accordance with an embodiment of the invention can use the AETs to provide a user with trick-play functions. When a user provides a trick-play instruction, the device uses the AETs to execute the trick-play function. In a number of embodiments, the client application requests all or portions of the media file using a transport protocol that allows for downloading of specific byte ranges within the media file. One such protocol is the HTTP 1.1 protocol published by The Internet Society or BitTorrent available from www.bittorrent.org. In other embodiments other protocols and/or mechanisms can be used to obtain specific portions of the media file from the media server.

Figure 20:
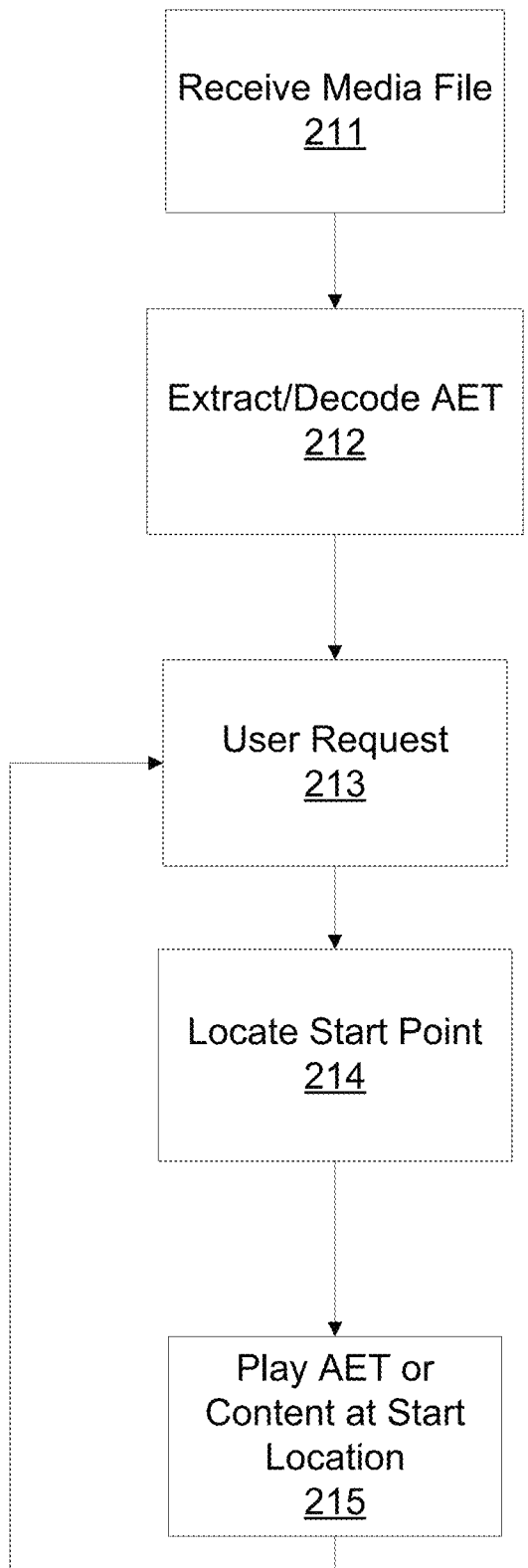
FIG. 20 is a flow chart showing a process of playing an application enhancement track along with the content in accordance with an embodiment of the invention.

In FIG. 20, one embodiment of utilizing the application enhancement tracks is shown. A media file is received or retrieved from, for example, a media server (211). The media file is examined to extract the application enhancement tracks (212). The user interface of the media player allows the user to interact with the media file, e.g., provide trick-play requests (213). For example, the user can indicate a desire to fast forward through the media content. As such, the media player accesses the AET and traverses the AET in a forward direction. In one embodiment, the media player determines the time and position of the content being played and locates the corresponding time and position of the AET relative to the content (214). In many embodiments, the corresponding position is located using timestamps within the AET.

In a number of embodiments, the corresponding position is located utilizing an index. The media player from this location sequentially decodes or plays the frames in the AET until a user request to stop (215). Through 2×, 4×, etc. fast forward user requests, the speed in which the AET is decoded or displayed can also be varied by the user. Rewind requests operate in the same manner but in a direction opposite of the forward requests. At a user "play" request, the media player determines the time and position of the AET relative to content and from this location sequentially decodes the frames in the content until another user request is received.

In many embodiments, locating a frame with a timestamp corresponding to a frame within an AET can involve locating a key-frame with the closest timestamp preceding the desired timestamp within an index contained within the multimedia file, decoding the key-frame and decoding the difference frames between the key-frame and the difference frame with the desired timestamp. At which point, the presentation can commence playing using the higher resolution content. In many embodiments, other techniques are used to seamlessly transition from viewing low resolution content in an AET during a trick-play mode and the higher resolution tracks that contain the full content within the multimedia file.

In the case where timestamps are not present in the media file, e.g., audio video interleaved (AVI) files, locating the start point to play the higher resolution content is based on the position of the AET within the media file. In one embodiment, a timestamp although not present in the AET or content is derived from the frame count and the associated frame rate. Using this derived timestamp, a frame within the high resolution content that corresponds to the AET frame or closest AET frame and vice versa can be located.

Generally, application enhancement tracks are derived from the main content that they are associated with. They are typically encoded to aid the performance of one or more functions related to the content, such as visual-search, or content-preview, and can be stored in the same file as the main content, or in one or more separate files. AETs provide many factors of improved performance while incurring only a slight increase to the cost associated with the main content (storage, transfer speed, etc.). In fact, since the AET is a fractional cost of the main content, only that track may be needed to perform certain functions and can therefore reduce the overall cost of viewing, or otherwise interacting with, the content.

An AET is not tied to any single type of media data or encoding standard, and is in fact equally applicable to many widely used video standards (MPEG-2, MPEG-4 Part 2 and H.264) as well as widely available media formats (DivX, DVD, Blu-ray Disc, HD-DVD).

In several embodiments that implement the methods and systems described above, scalable speeds of visual-search can be conducted in both the forward and reverse directions while incurring additional file size costs of only 5% relative to the size of the main content file. Furthermore, these same tracks can be utilized for content-preview animations.

Finally, it should be understood that while preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A method of encoding and playing back a media file, comprising:
    extracting a video track from an original media file, where content is encoded in the video track;
    using the encoded content to encode a tricky-play track configured to enable the visual-search of the video track, where encoding the tricky-play track includes encoding at least one key frame that corresponds to a frame in the encoded content that is not a key frame and where the distance between key frames in the encoded content is not uniform;

requesting portions of the encoded content from a media server using HTTP using a playback device;

playing back a portion of the compressed video track using the playback device;

receiving a trick-play request using the playback device;

determining, in response to the received trick-play request, a position in the trick-play track corresponding to the position of the compressed video track being played using a first index using the playback device;

playing back a portion of the trick-play track starting from the determined position in the trick-play track using the playback device;

receiving a normal-play request using the playback device;

determining, in response to the received normal-play request, a position in the compressed video track corresponding to the position of the trick-play track being played using a second index using the playback device;

locating a key frame with the closest timestamp preceding the determined position in the compressed video track;

recursively decoding the located key frame and decoding the difference frames between the located key frame and the difference frame at the determined position in the compressed video track; and playing back a portion of the compressed video track starting from the difference frame at the determined position in the compressed video track.

2. The method of claim 1 wherein information is discarded from the content by sub-sampling the content.

3. The method of claim 2 wherein sub-sampling the content further comprises reducing a spatial resolution scale of the content by a particular factor to generate the trick-play track.

4. The method of claim 2 wherein sub-sampling the content further comprises reducing a frame rate of the content by a particular factor to generate the trick-play track.

5. The method of claim 4 wherein creating the media file further comprises embedding portions of the accompanying trick-play track throughout the video track encoding the content.

6. The method of claim 4 wherein creating the media file further comprises incorporating the accompanying trick-play track as a block within the media file.

7. The method of claim 1 wherein the trick-play track contains only video.

8. The method of claim 1 wherein the trick-play track contains key frames spaced at specific time intervals between each key-frame.

9. The method of claim 1 wherein creating a media file including the content from the original media file encoded in a video track and the accompanying trick-play track further comprises:

re-encoding the content of the video track to create a compressed video track possessing the same resolution and frame rate as the video track, where the video track includes a plurality of key frames and the compressed video track includes fewer key frames than the video track; and creating a media file including the compressed video track and the accompanying trick-play track;

wherein the media file including the compressed video track and the trick-play track is smaller than the original media file.

10. The method of claim 1 wherein the content is compressed content.

11. A method of decoding a media file for playing back, comprising:

requesting portions of a media file from a media server using HTTP using a playback device, where the media file contains compressed video content and is associated with an accompanying trick-play track which contains at least one key frame that corresponds to a frame in the compressed video content that is not a key frame and where the distance between key frames in the compressed video content is not uniform;

playing back a potion of the compressed video content;

receiving a trick-play request using the payback device determining, in response to the received trick-play request, a position in the trick-play track corresponding to the position of the compressed video content being played back using a first index using the playback device;

decoding frames of the trick-play track at a rate proportional to a visual-search speed and from a the determined position in the trick-play track using the playback device;

receiving a normal-play request using the playback device;

determining, in response to the received normal-play request, a position in the compressed video content corresponding to the position of the trick-play track being played using a second index using the playback device;

locating a key frame with the closest timestamp preceding the determined position in the compressed video content;

recursively decoding the located key frame and decoding the difference frames between the located key frame and the difference frame at the determined position in the compressed video content; and playing back a portion of the compressed video content starting from the difference frame at the determined position in the compressed video content.

12. The method of claim 11 wherein the trick-play track includes only key-frames.

13. The method of claim 11 further comprising at least one delta frame placed within a constant time difference to adjacent frames.

14. The method of claim 11 wherein only key-frames are decoded when a predetermined visual-search speed is exceeded.

15. The method of claim 11 wherein a select number of key-frames are skipped along with any associated delta frames when a predetermined visual-search speed is exceeded.

16. The method of claim 11 wherein the trick-play track is part of the media file and is the compressed content at a reduced frame rate and at a reduced resolution.

17. A system for playback of a media file, comprising:

a media server configured to generate at least one trick-play track from an original media file, the at least one trick-play track containing at least one key frame that corresponds to a frame encoded content contained in the original media file that is not a key frame, and where the distance between key frames in the encoded content is not uniform; and create a media file including encoding content from the original media file encoded in a compressed video track and an accompanying trick-play track and being substantially smaller in file size than the original media file; and a client processor in network communication with the media server and configured to:

send requests for portions of the media file to the media server using HTTP, the media server configured to transmit the requested media file using HTTP;
play back a portion of the compressed video track;
receive a trick-play request;
determine, in response to the received trick-play request, a position in the trick-play track corresponding to the position of the compressed video track being played using a first index;
play back a portion of the trick-play track starting from the determined position in the trick-play track;
receive a normal-play request using the playback device;
determine, in response to the received normal-play request, a position in the compressed video track corresponding to the position of the trick-play track being played using a second index using the playback device;
locate a key frame with the closest timestamp preceding the determined position in the compressed video track;
recursively decode the located key frame and decoding the difference frames between the located key frame and the difference frame at the determined position in the compressed video track; and
play back a portion of the compressed video track starting from the difference frame at the determined position in the compressed video track.

* * * * *